(12) United States Patent
Okuyama et al.

(10) Patent No.: US 11,806,916 B2
(45) Date of Patent: Nov. 7, 2023

(54) BLOW MOLDING DEVICE

(71) Applicant: YOSHINO KOGYOSHO CO., LTD., Tokyo (JP)

(72) Inventors: Yuichi Okuyama, Tokyo (JP); Mitsuru Shiokawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 88 days.

(21) Appl. No.: 17/614,463

(22) PCT Filed: Mar. 5, 2020

(86) PCT No.: PCT/JP2020/009502
§ 371 (c)(1),
(2) Date: Nov. 26, 2021

(87) PCT Pub. No.: WO2020/240972
PCT Pub. Date: Dec. 3, 2020

(65) Prior Publication Data
US 2022/0234273 A1   Jul. 28, 2022

(30) Foreign Application Priority Data

May 31, 2019   (JP) .................................. 2019-103111

(51) Int. Cl.
*B29C 49/46* (2006.01)
*B29C 49/42* (2006.01)
(Continued)

(52) U.S. Cl.
CPC .......... *B29C 49/30* (2013.01); *B29C 49/4205* (2013.01); *B29C 49/46* (2013.01);
(Continued)

(58) Field of Classification Search
CPC .............. B29C 49/46; B29C 2049/465; B29C 2049/4664; B29C 49/4273
(Continued)

(56) References Cited

U.S. PATENT DOCUMENTS 2,874,734 A * 2/1959 Luckock ............... B67C 3/2637
141/264
4,572,252 A * 2/1986 Ponzi ...................... B65B 39/00
141/90
(Continued)

FOREIGN PATENT DOCUMENTS

CN   107614240 A   1/2018
JP   H07-242214 A   9/1995
(Continued)

OTHER PUBLICATIONS

Feb. 4, 2023 Office Action issued in Chinese Patent Application No. 202080039244.4.
(Continued)

*Primary Examiner* — Robert B Davis
(74) *Attorney, Agent, or Firm* — Oliff PLC

(57) ABSTRACT

A blow molding apparatus including: a mold; a blow nozzle; a pressurized fluid supply unit; and a blow nozzle moving unit configured to cause a relative movement of the blow nozzle between a connected position and a standby position, wherein a preform is molded into a container by supplying a pressurized incompressible fluid into the preform. The blow molding apparatus includes: a drawing member including a drawing port; a drawing pump configured to be connected to the drawing member; and a drawing member moving unit configured to move the drawing member so that the drawing port is positioned below the blow nozzle, after the container has been molded and the blow nozzle has been moved from the connected position to the standby position.

6 Claims, 10 Drawing Sheets

(51) Int. Cl.
   *B29C 49/30* (2006.01)
   *B29K 101/12* (2006.01)
   *B29L 31/00* (2006.01)

(52) U.S. Cl.
   CPC .... *B29C 2049/465* (2013.01); *B29K 2101/12* (2013.01); *B29L 2031/7158* (2013.01)

(58) Field of Classification Search
   USPC ......................................................... 222/108
   See application file for complete search history.

(56) References Cited

U.S. PATENT DOCUMENTS

| | | | | |
|---|---|---|---|---|
| 5,261,566 | A | * | 11/1993 | Nakayama .............. B05B 15/55 141/90 |
| 2013/0180219 | A1 | * | 7/2013 | Chauvin ................. B65B 3/022 53/559 |
| 2017/0217076 | A1 | | 8/2017 | Shiokawa et al. |
| 2018/0043606 | A1 | | 2/2018 | Morikami et al. |

FOREIGN PATENT DOCUMENTS

| | | |
|---|---|---|
| JP | 2013-208834 A | 10/2013 |
| JP | 2016-032921 A | 3/2016 |
| JP | 2016-168801 A | 9/2016 |
| WO | 2019/058813 A1 | 3/2019 |

OTHER PUBLICATIONS

Apr. 28, 2020 International Search Report issued in International Patent Application No. PCT/JP2020/009502.

Jan. 4, 2023 Search Report issued in European Patent Application No. 20814846.0.

Nov. 16, 2021 International Preliminary Report on Patentability issued in Patent Application No. PCT/JP2020/009502.

Jun. 28, 2023 Office Action issued in Chinese Patent Application No. 202080039244.4.

\* cited by examiner

BLOW MOLDING DEVICE

TECHNICAL FIELD

This application relates to a blow molding apparatus that blow molds a synthetic resin preform into a container having a predetermined shape, in particular to a blow molding apparatus that uses an incompressible fluid, such as a liquid, as a pressurizing medium for performing blow molding.

BACKGROUND

Synthetic resin containers, typical examples of which include polypropylene (PP) bottles and polyethylene terephthalate (PET) bottles, are used to contain a variety of contents, such as beverages, cosmetics, pharmaceuticals, liquid detergents, or shampoo. Such a container is typically manufactured by blow molding a synthetic resin preform into a predetermined shape using a blow molding apparatus, after the preform is heated to a temperature at which a stretching effect may be achieved.

Blow molding apparatuses that use incompressible fluids, such as pressurized liquids, instead of pressurized air, as pressurizing media to be supplied into preforms are known. In this case, contents which are to be ultimately filled into containers as products may be used as pressurizing media. By doing so, the step of filling contents into a container may be omitted, and the production process and the configuration of manufacturing apparatus may be simplified.

For example, Patent Literature (PTL) 1 describes a blow molding apparatus including a mold for blow molding, a blow nozzle configured to be disposed above the mold, a pressurized fluid supply unit configured to supply a pressurized liquid to the blow nozzle, and a blow nozzle moving unit configured to cause a relative movement of the blow nozzle between a connected position in which the blow nozzle is connected to a mouth tubular portion of a preform that has been placed in the mold and a standby position in which the blow nozzle is upward and away from the mouth tubular portion. In the described blow molding apparatus, the preform is molded into a container having a shape corresponding to a cavity of the mold, by supplying the pressurized liquid into the preform through the blow nozzle which is in the connected position.

CITATION LIST

Patent Literature

PTL 1: JP 2013-208834 A

SUMMARY

Technical Problem

In a known blow molding apparatus as described in PTL 1, after a container has been blow molded and when the blow nozzle is raised to its standby position so as to be disconnected from the mouth tubular portion of the container, a liquid (incompressible fluid) can drip down from the surface of the blow nozzle to which it has adhered. In particular, in a case in which a relatively highly viscous liquid, such as shampoo or liquid detergent, is used as a pressurized medium for blow molding, it takes long for the dripping down of the liquid to start from the blow nozzle after blow molding, and moreover, the liquid continues to run in a thin stream for a while. Accordingly, the liquid is likely to drip down from the blow nozzle onto the molded container or the mold from which the molded container has been removed, thus causing the problem of spoiling them.

It would be helpful to provide a blow molding apparatus capable of preventing an incompressible fluid from dripping down from the blow nozzle and adhering to a molded container or a mold, after the container has been blow molded and the blow nozzle has been separated from the mouth tubular portion of the preform.

Solution to Problem

One aspect of the present disclosure resides in a blow molding apparatus including:
  a mold for blow molding;
  a blow nozzle configured to be disposed above the mold;
  a pressurized fluid supply unit configured to supply a pressurized incompressible fluid to the blow nozzle; and
  a blow nozzle moving unit configured to cause a relative movement of the blow nozzle between a connected position in which the blow nozzle is connected to a mouth tubular portion of a preform that has been placed in the mold and a standby position in which the blow nozzle is upward and away from the mouth tubular portion, wherein
  the preform is molded into a container having a shape corresponding to a cavity of the mold, by supplying the pressurized incompressible fluid into the preform through the blow nozzle which is in the connected position, the blow molding apparatus including:
  a drawing member including a drawing port;
  a drawing pump configured to be connected to the drawing member; and
  a drawing member moving unit configured to move the drawing member so that the drawing port is positioned below the blow nozzle, after the container has been molded and the blow nozzle has been moved from the connected position to the standby position.

In a preferred embodiment of the blow molding apparatus configured as above, the drawing port is open in a horizontal direction.

In another preferred embodiment of the blow molding apparatus configured as above, the blow molding apparatus further includes:
  a saucer; and
  a saucer moving unit configured to move the saucer to below the blow nozzle on a lower side of the drawing member, after the container has been molded and the blow nozzle has been moved from the connected position to the standby position.

In still another preferred embodiment of the blow molding apparatus configured as above, after the drawing member moving unit has moved the drawing member so that the drawing port is positioned below the blow nozzle, the saucer moving unit moves the saucer to below the blow nozzle.

Advantageous Effect

According to the present disclosure, a blow molding apparatus capable of preventing an incompressible fluid from dripping down from the blow nozzle and adhering to a molded container or a mold, after the container has been blow molded and the blow nozzle has been separated from the mouth tubular portion of the preform can be provided.

DETAILED DESCRIPTION

Hereinafter, the present disclosure will be described by illustration in more detail with reference to the drawings.

Figure 1:
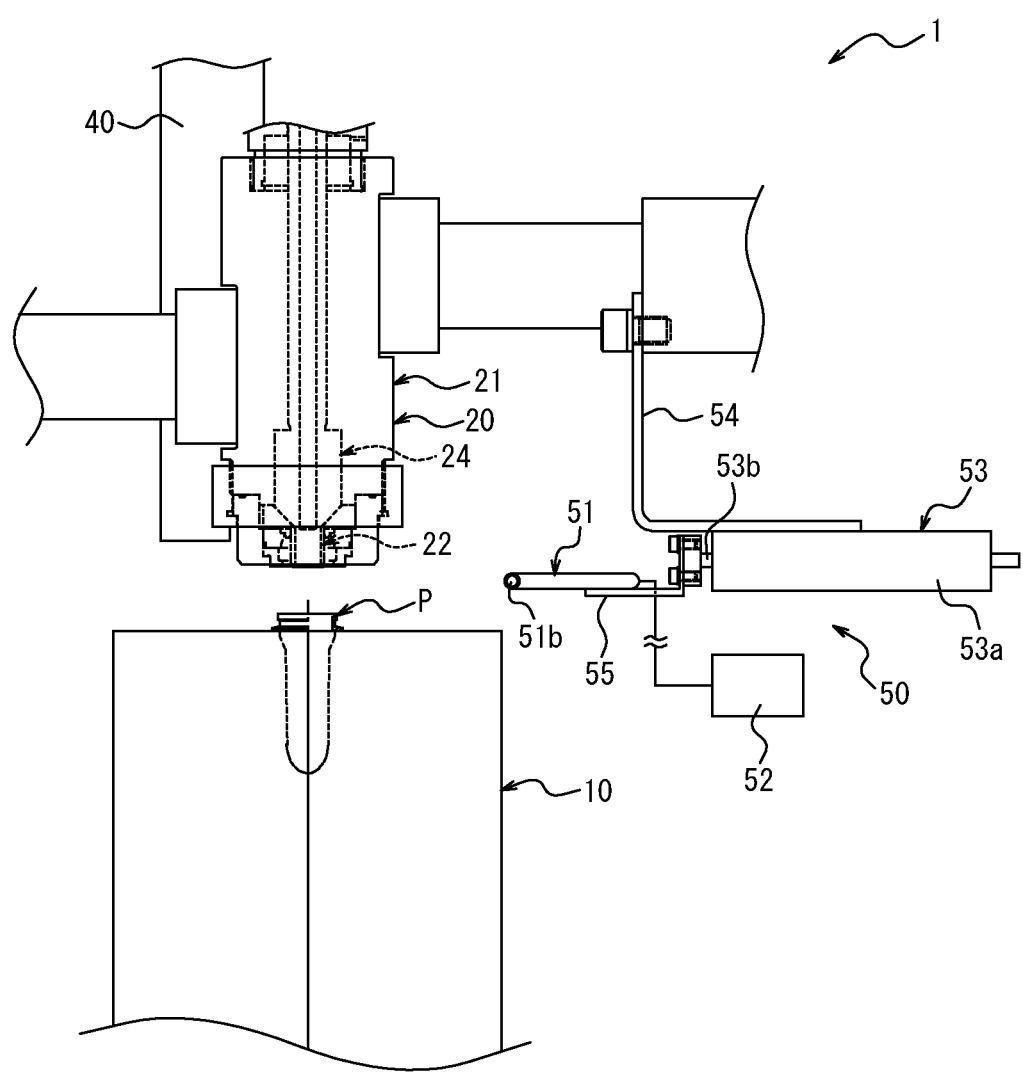
FIG. 1 illustrates a blow molding apparatus according to an embodiment of the present disclosure.

A blow molding apparatus 1 according to an embodiment of the present embodiment as illustrated in FIG. 1 blow molds a synthetic resin preform 2, using an incompressible fluid, which is to be ultimately filled into a container, as a pressurizing medium. Thus, the container C having a predetermined shape for containing the incompressible fluid as the contents is manufactured. The blow molding apparatus 1 includes a mold 10 for blow molding.

Figure 2:
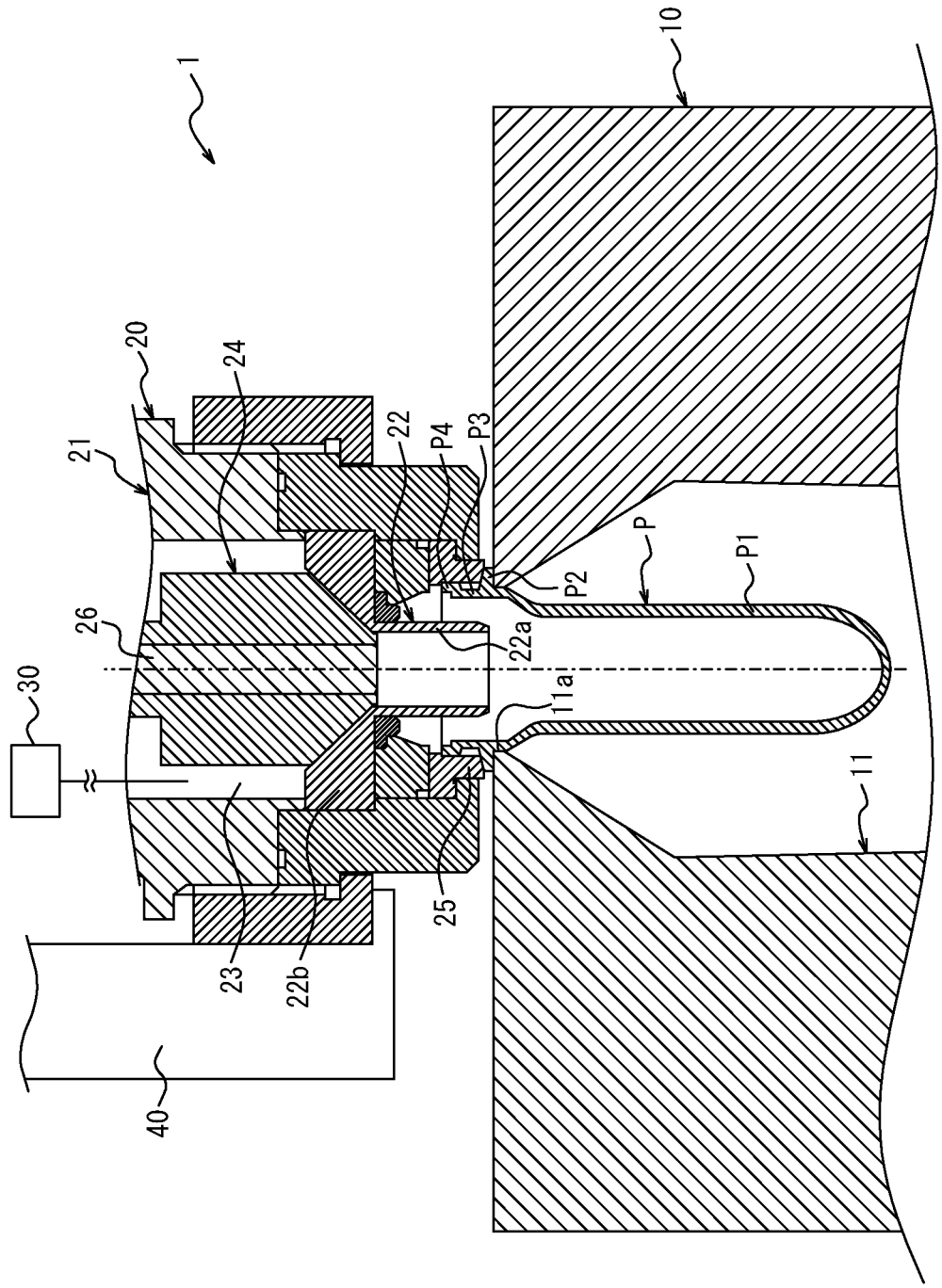
FIG. 2 is an enlarged sectional view illustrating a portion of the blow molding apparatus of FIG. 1.

As illustrated in FIG. 2, the mold 10 includes a cavity 11 that defines a molding surface. The cavity 11 of the mold 10 has a bottle shape with an opening 11a provided in its upper end, so that the opening 11a is open at an upper surface of the mold 10.

The preform P can be placed (fitted) in the mold 10. In the present embodiment, as the preform P to be placed in the mold 10, a preform that integrally includes a test tube-shaped body P1 having a large-diameter upper portion and a cylindrical-shaped mouth tubular portion P3 is illustrated as being used. The preform also integrally includes an undercut portion P4 that is provided in an upper portion of the mouth tubular portion P3 and protrudes toward the outer side in the radial direction, and a neck ring P2 that is provided in a lower end of the mouth tubular portion P3 and extends toward the outer side in the radial direction. In this case, the preform P is placed in the mold 10 in an upright position, with the mouth tubular portion 3 being arranged on the upper side, so that the mouth tubular portion P3 protrudes above the upper surface of the mold 10 while the neck ring P2 is placed on the upper surface of the mold 10 and that the body P1 is positioned in the cavity 11 through the opening 11a. Additionally, the central axis of the preform P that has been placed in the mold 10 coincides with the central axis of the opening 11a.

Although not illustrated in detail, the mold 10 is configured to be opened into left and right mold halves along the central axis of the opening 11a. By opening the mold 10 into left and right mold halves, a molded container can be removed from the mold 10.

The preform P is not limited to a preform with the above shape, and preforms with various shapes, which include the mouth tubular portion P3 and can be placed in the cavity 11 of the mold 10, may be used. As the preform 2, for example, it is possible to use a preform that has been obtained by forming a thermoplastic synthetic resin material, which exhibits stretchability when being heated, into a desired shape by injection molding, compression molding, extrusion molding, or the like. The thermoplastic synthetic resin material may be polypropylene (PP), polyethylene terephthalate (PET), polyethylene (PE), or the like.

As illustrated in FIG. 1 and FIG. 2, a nozzle unit 20 is provided above the mold 10. The nozzle unit 20 includes a body block 21, and a blow nozzle 22 fixed to a lower end of the body block 21. In the present embodiment, the body block 21 is configured by combining a plurality of members, although a detailed description thereof will be omitted.

As illustrated in FIG. 2, in the body block 21, there is provided a supply flow path 23 extending in the vertical direction. The supply flow path 23 has a lower end that is connected to the blow nozzle 22.

The blow nozzle 22 includes a nozzle body 22a formed in a cylindrical shape having a smaller diameter than the inner diameter of the mouth tubular portion P3 of the preform P, and a large-diameter holding portion 22b integrally provided on the upper side of the nozzle body 22a. At the holding portion 22b, the blow nozzle 22 is held by and fixed to the inner surface of the body block 21. The blow nozzle 22 is coaxial with the opening 11a of the mold 10.

Additionally, the blow nozzle 22 does not necessarily need to have a cylindrical shape, and may have various shapes, such as an elliptical or polygonal tube shape, by which the blow nozzle 22 can be connected to the mouth tubular portion P3 of the preform P.

A pressurized fluid supply unit 30 is connected to the supply flow path 23. The pressurized fluid supply unit 30 may supply the incompressible fluid that has been pressurized to a predetermined pressure to the blow nozzle 22 through the supply flow path 23. As the pressurized fluid supply unit 30, for example, it is preferable to use a configuration in which a plunger pump is used as a pressure source. It is, however, possible to use another configuration, by which the incompressible fluid that has been pressurized to a predetermined pressure can be supplied to the blow nozzle 22.

As the incompressible fluid that is to be supplied to the blow nozzle 22 by the pressurized fluid supply unit 30, for example, a relatively highly viscous liquid, such as shampoo or liquid detergent, may be used. In this case, the incompressible fluid is preferably an incompressible fluid having a viscosity of not more than 10000 mPa·s during its supply into the preform P.

In the supply flow path 23, a seal body 24 is disposed in a manner such that it is movable in the vertical direction, so as to open and close the blow nozzle 22. When the seal body 24 is moved to its lower stroke end, a tapered lower end surface of the seal body 24 abuts against a tapered upper surface of the holding portion 22b of the blow nozzle 22, and the blow nozzle 22 is thus closed. On the other hand, when the seal body 24 moves upward and away from the tapered upper surface of the holding portion 22b, the blow nozzle 22 is opened.

The nozzle unit 20 is driven by a blow nozzle moving unit 40, so as to be raised and lowered along the central axis of the opening 11a. As the blow nozzle moving unit 40, for example, it is possible to use a configuration in which a linear guide with a linear rail extending in the vertical direction and a slider movably arranged thereon is combined with a ball screw mechanism for converting rotational motion of an electric motor into linear motion. It is, however, possible to use another configuration.

When the nozzle unit 20 is moved to its lower stroke end by the blow nozzle moving unit 40, the blow nozzle 22 is brought into its connected position (position illustrated in FIG. 2), in which the nozzle body 22a is inserted into the mouth tubular portion P3 of the preform P that has been placed in the mold 10, so as to be connected to the mouth tubular portion P3. On the other hand, when the nozzle unit 20 is moved to its upper stroke end by the blow nozzle moving unit 40, the blow nozzle 22 is brought into its standby position (position illustrated in FIG. 1), in which the nozzle body 22a is positioned above and away from the mouth tubular portion P3 of the preform P that has been placed in the mold 10, so as to be disconnected from the mouth tubular portion P3.

As illustrated in FIG. 2, the body block 21 is provided, at a lower end thereof, with an annular-shaped sealing claw portion 25 that surrounds the outer periphery of the nozzle body 22a. When the nozzle unit 20 is moved to its lower stroke end and the nozzle body 22a is connected to the mouth tubular portion P3 of the preform P, the sealing claw portion 25 abuts against an upper surface of the neck ring P2, so that the preform P is fixed and held in the mold 10.

The blow molding apparatus 1 may also be configured to include a stretching rod 26 for stretching the preform P in its longitudinal direction. The stretching rod 26 is slidably fitted in a hole provided along the axial center of the seal body 24, and the stretching rod 26 is movable in the axial direction, that is, the vertical direction relative to the seal body 24. At the time of blow molding, the preform P that has been placed in the mold 10 can be axially (longitudinally) stretched by the stretching rod 26 in the cavity 11, by moving the stretching rod 26 downward relative to the seal body 24.

As illustrated in FIG. 1, the blow molding apparatus 1 includes a drawing device 50. The drawing device 50 is used after blow molding of a container, so as to prevent the incompressible fluid from dripping down from the blow nozzle 22 and adhering to the molded container or the mold 10. The drawing device 50 is disposed beside the blow nozzle 22.

Figure 3:
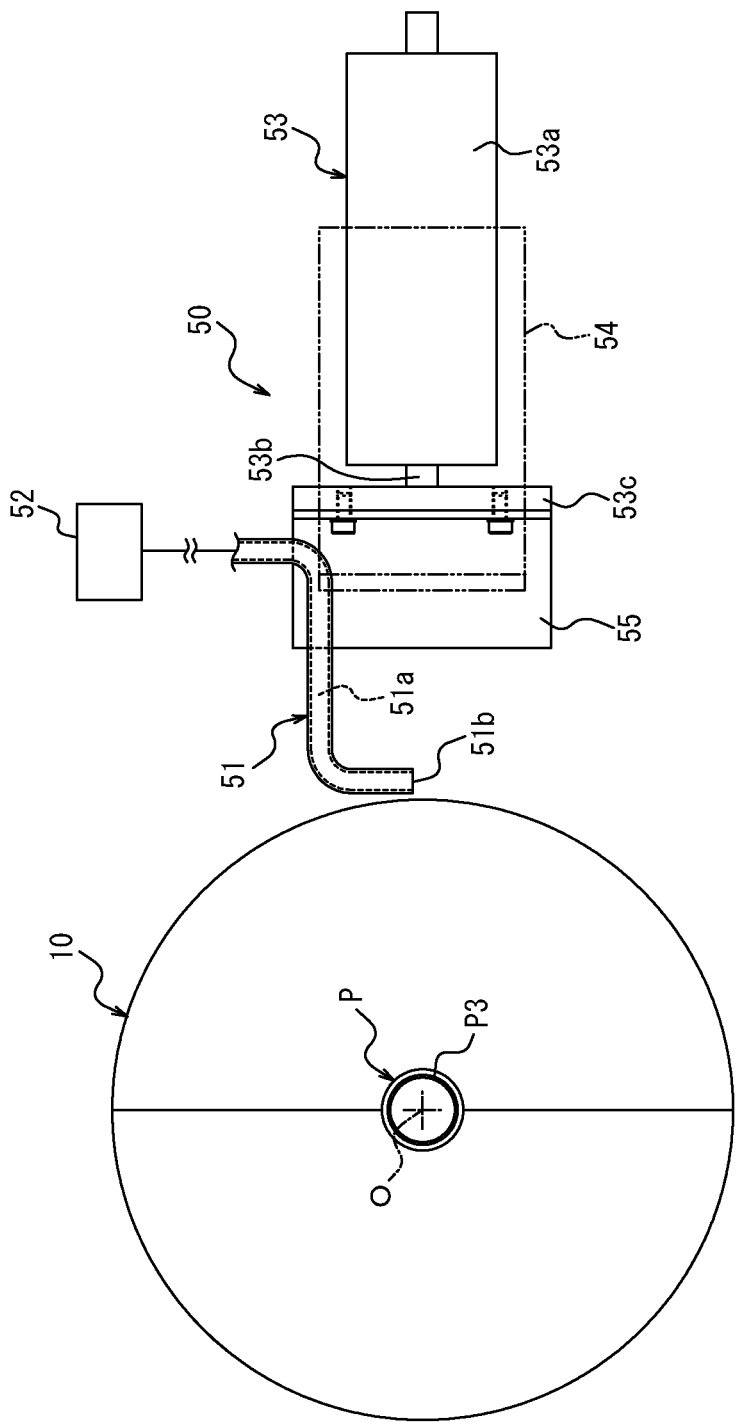
FIG. 3 is a plan view illustrating a mold and a drawing device of FIG. 1.

As illustrated in FIG. 1 and FIG. 3, the drawing device 50 has a drawing member 51, a drawing pump 52, and a drawing member moving unit 53.

The drawing member 51 is formed of a pipe material including a drawing passage 51a, and the drawing member 51 has a drawing port 51b formed at its end. An end portion of the pipe member is bent in an L-shape along the horizontal direction, and the drawing port 51b is open in the horizontal direction.

For example, the drawing pump 52 is configured by a vacuum pump, and is connected to the drawing passage 51a at a base end of the drawing member 51. The drawing pump 52 can generate drawing force for drawing, into the drawing port 51b through the drawing passage 51a, the incompressible fluid that drips down from the blow nozzle 22.

The drawing member moving unit 53 is configured by a cylinder with a guide. The drawing member moving unit 53 includes a cylinder body 53a, a piston rod 53b that makes advancing and retracting movements with respect to the cylinder body 53a, and a guide 53c that is fixed to an end of the piston rod 53b. The cylinder body 53a is fixed to the nozzle unit 20 using a fixing bracket 54.

A holding plate 55 that is bent in an L-shape is fixed to the guide 53c, and the drawing member 51 is fixed to and held by the holding plate 55. In a state in which the drawing member 51 is fixed to and held by the holding plate 55, an end of the drawing member 51 is positioned away from the holding plate 55 on the front side (that is closer to the mold 10) in the advancing and retracting direction of the piston rod 53b, and the drawing port 51b faces a direction that is perpendicular to the advancing and retracting direction of the piston rod 53b.

The drawing member moving unit 53 can cause the drawing member 51 to move from beside the blow nozzle 22 to its drawing position in which the drawing port 51b is positioned below the blow nozzle 22, by causing the piston rod 53b to make an advancing movement to the front side with respect to the cylinder body 53a.

Additionally, although in this embodiment the drawing member moving unit 53 is configured by a cylinder with a guide, the present disclosure is not limited to this example, and various configurations that allow the drawing member 51 to move can be used. Further, the drawing member moving unit 53 does not necessarily need to cause the drawing member 51 to move in a linear path and may cause it to move in a curved path.

Although an illustration is omitted, the blow molding apparatus 1 includes a preform feeding means for feeding the preform P to the mold 10, and a conveyor means for removing a molded container from the mold 10 and conveying it to the subsequent step. As the preform feeding means and the conveyor means, for example, a guided cylinder including a holder for holding a preform or a container therein may be used. It is however also possible to use those with various configurations. Additionally, without using the preform feeding means and the conveyor means, an operator may manually perform the feeding of a preform or cap or the removal of a container.

Next, a procedure for blow molding the preform P into a container having a predetermined shape using the blow molding apparatus 1 having the above configuration will be described.

First, as illustrated in FIG. 1, in a state in which the nozzle unit 20 has been moved to its upper stroke end so that the blow nozzle 22 is in its standby position and in which the drawing member 51 has been withdrawn to beside the blow nozzle 22, the preform P is placed in the mold 10, and the mold 10 is closed. Additionally, in a state in which the preform P has been placed in the mold 10, the drawing member 51 may be configured to be positioned below the blow nozzle 22 while the drawing pump 52 is being operated, until immediately before the blow nozzle 22 starts to move from its standby position to its connected position so as to be connected to the mouth tubular portion P3 of the preform P. In this case, the drawing member 51 may be configured to move to beside the blow nozzle 22 thereafter.

Figure 4:
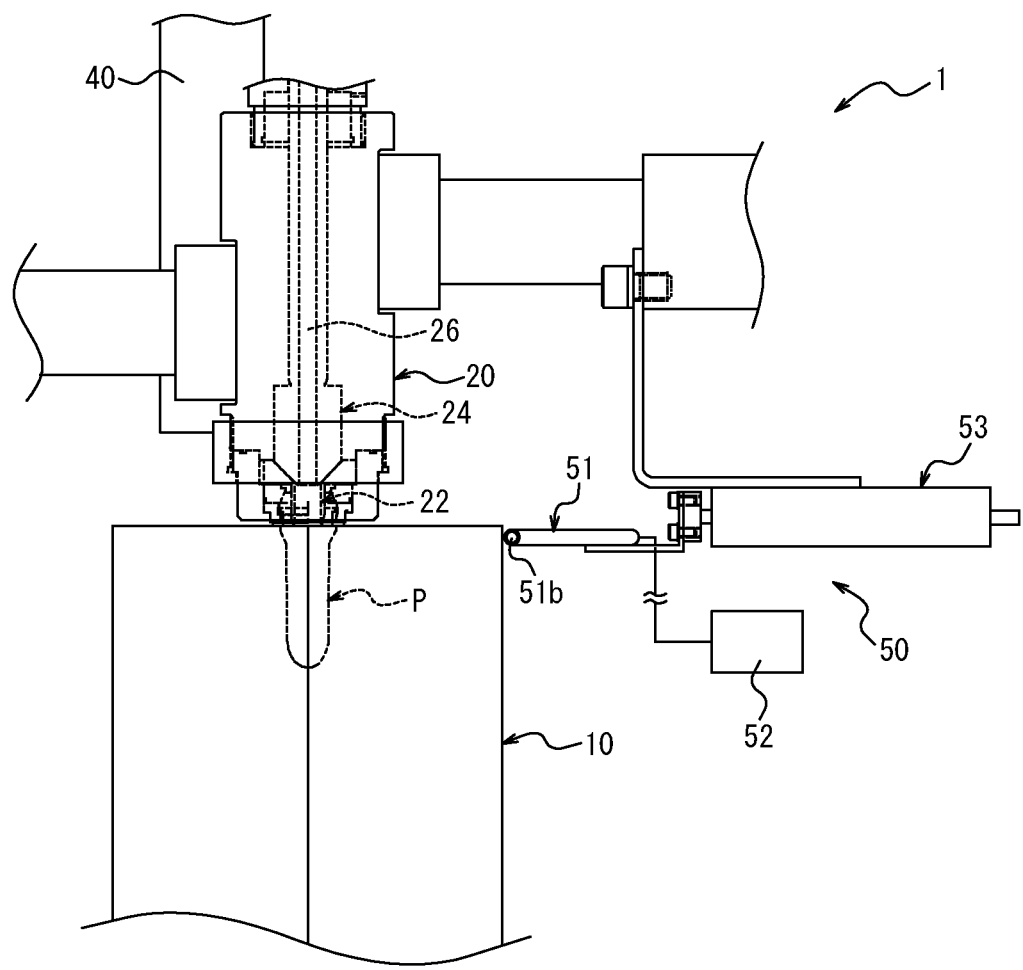
FIG. 4 illustrates the blow molding apparatus in a state in which a blow nozzle has been moved from its standby position to its connected position.

Subsequently, as illustrated in FIG. 4, the blow nozzle 22 is moved downward to its connected position by the blow nozzle moving unit 40, so that the blow nozzle 22 is connected to the mouth tubular portion P3 of the preform P.

Figure 5:
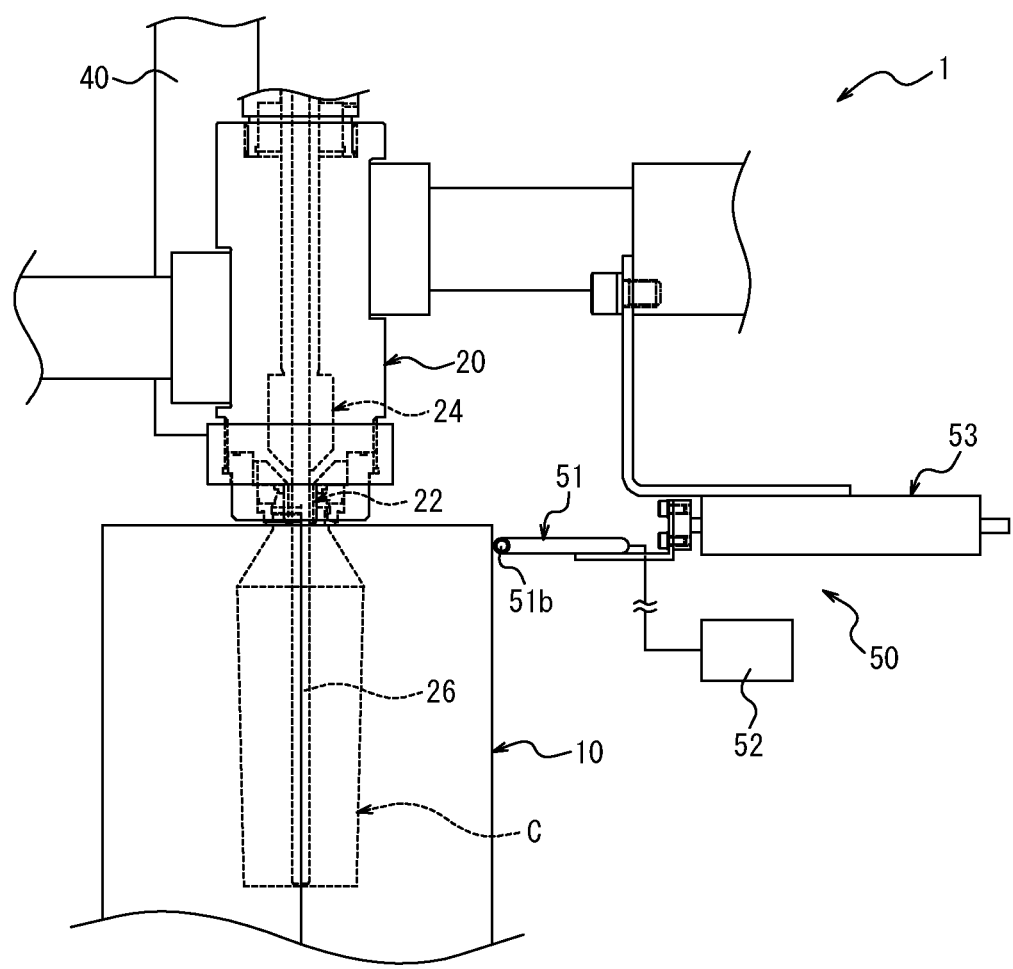
FIG. 5 illustrates the blow molding apparatus in a state in which a preform is being blow molded.

Subsequently, as illustrated in FIG. 5, the seal body 24 is raised so as to open the blow nozzle 22, while the stretching rod 26 is lowered to thereby stretch the preform P in the longitudinal direction. A pressurized incompressible fluid is therefore supplied into the preform P from the pressurized fluid supply unit 30 through the blow nozzle 22 that is in its connected position. Thus, the preform P is subject to biaxial stretch blow molding and molded into a container C having a predetermined shape conforming to the shape of the cavity 11 of the mold 10.

When blow molding is complete, the stretching rod 26 is raised, the blow nozzle 22 is closed by the seal body 24, and the supply of the pressurized incompressible fluid from the pressurized fluid supply unit 30 to the blow nozzle 22 is stopped. Then, the blow nozzle 22 is driven upward by the blow nozzle moving unit 40, so that the blow nozzle 22 is moved from its connected position to its standby position.

Figure 6:
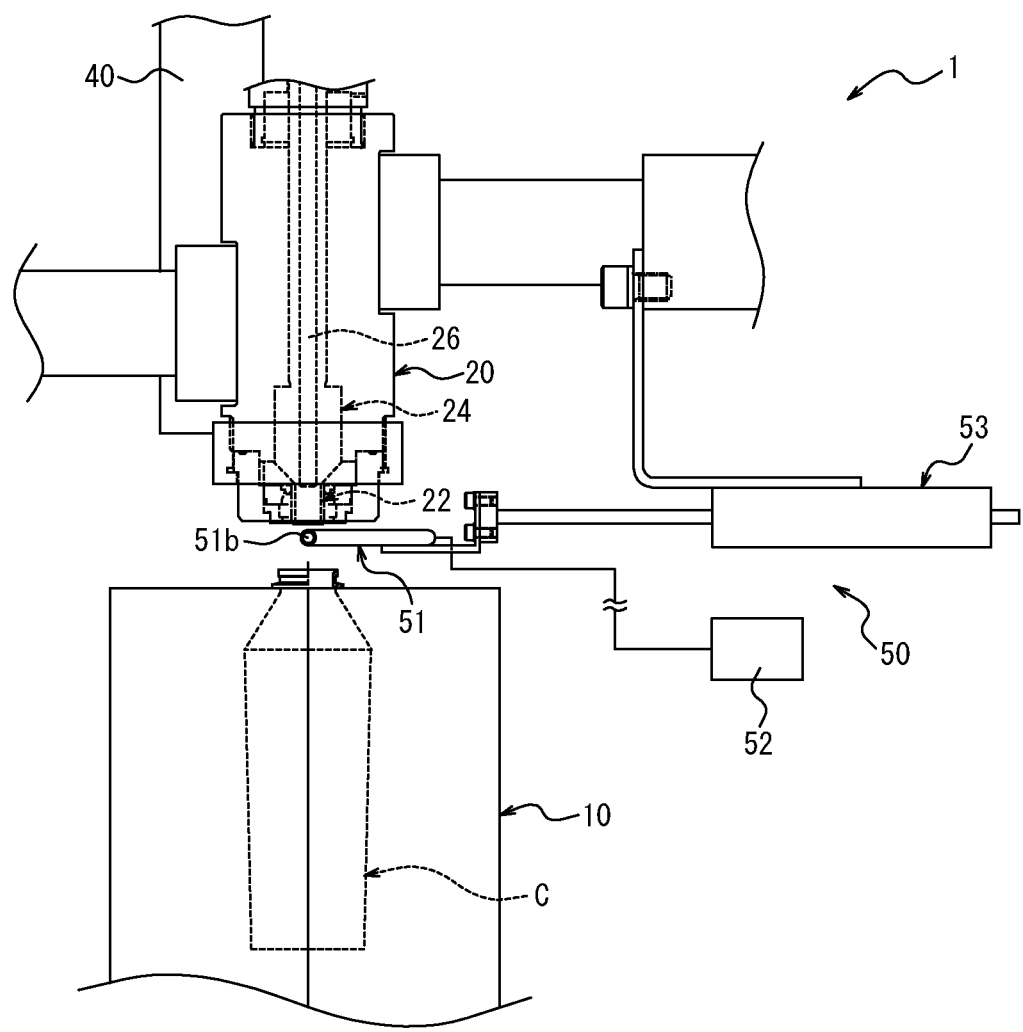
FIG. 6 illustrates the blow molding apparatus in a state in which a drawing member has been moved so that a drawing port is positioned below the blow nozzle, after a container has been molded and the blow nozzle has been moved from its connected position to its standby position.
Figure 7:
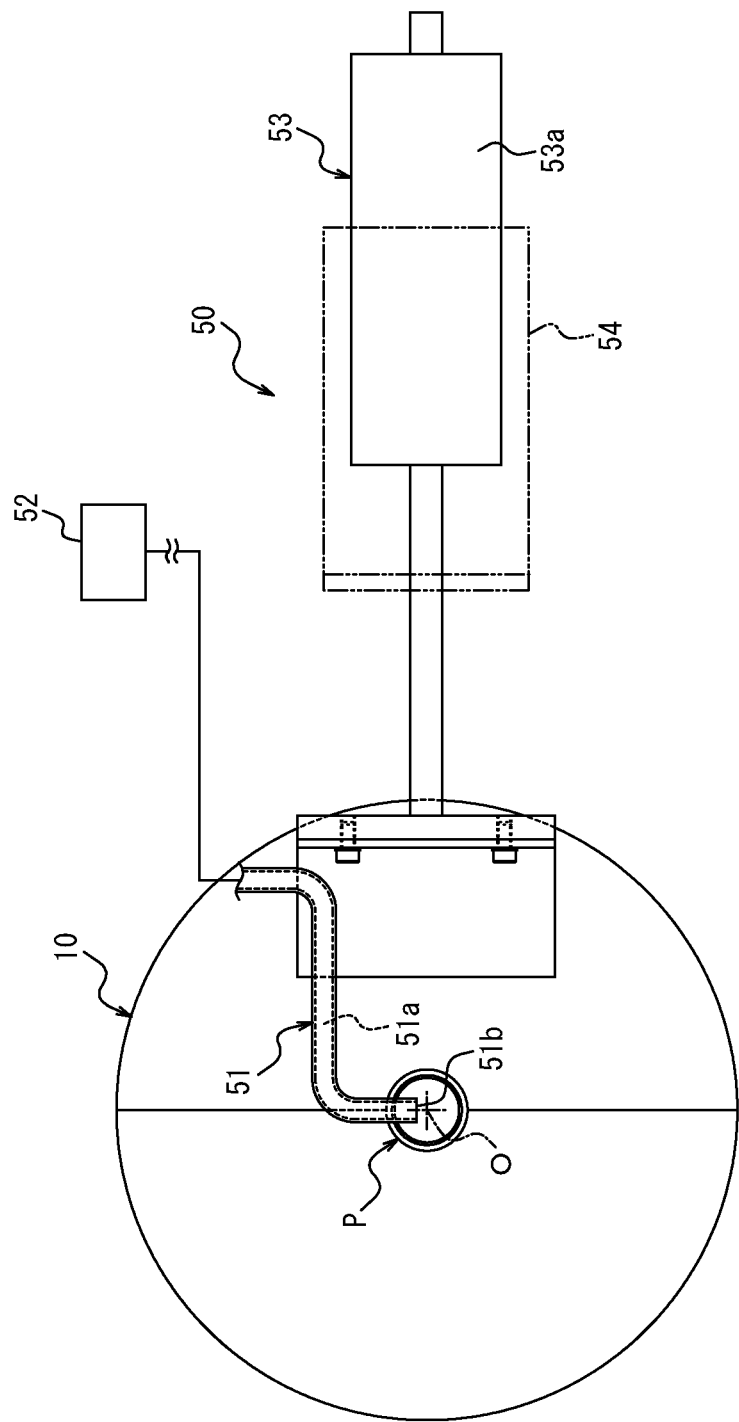
FIG. 7 is a plan view illustrating a positional relationship between the mold and the drawing device in the state of FIG. 6.

Subsequently, as illustrated in FIG. 6 and FIG. 7, the drawing member 51 is moved forward toward a position below the blow nozzle 22 by the drawing member moving unit 53, so that the drawing port 51b is positioned below the blow nozzle 22. At this time, although the drawing port 51b may be disposed on the central axis of the blow nozzle 22, the drawing port 51b is preferably disposed at a position a predetermined distance apart from the central axis of the blow nozzle 22 in the horizontal direction. In this case, the predetermined distance between the drawing port 51b and the central axis O of the blow nozzle 22 is appropriately changed in accordance with the drawing force generated in the drawing port 51b, the viscosity and amount of the incompressible fluid, or the like. Additionally, the drawing member 51 may start to move after the blow nozzle 22 has moved to its standby position, or may start to move while the blow nozzle 22 is moving from its connected position to its standby position.

Further, the drawing pump 52 is operated so as to apply drawing force to the drawing port 51b. Although it is preferable to operate the drawing pump 52 in advance before the drawing port 51b is positioned below the blow nozzle 22, the drawing pump 52 may be operated after the drawing port 51b is positioned below the blow nozzle 22.

After the molding of the container C and when the blow nozzle 22 is raised to its standby position, the incompressible fluid can drip down from the blow nozzle 22 to which it has adhered. In particular, in a case in which a relatively highly viscous liquid, such as shampoo or liquid detergent, is used as the incompressible fluid, it takes long for the dripping down of the incompressible fluid to start from the blow nozzle 22 after blow molding, and moreover, the incompressible fluid continues to run in a thin stream for a while.

In the blow molding apparatus 1 according to the present embodiment, however, after the container C has been molded and the blow nozzle 22 has been moved from its connected position to its standby position, the drawing port 51b of the drawing member 51, which generates drawing force, is positioned below the blow nozzle 22. Accordingly, even when the incompressible fluid adheres to the blow nozzle 22 during blow molding and drips down from the blow nozzle 22 when it is moved to its standby position, the dripped down incompressible fluid can be drawn into the drawing passage 51a of the drawing member 51 through the drawing port 51b. Thus, the dripping down onto the molded container C or the mold 10 can be prevented.

Thus, in the blow molding apparatus 1 according to the present embodiment, after the container C has been molded and the blow nozzle 22 has been moved from its connected position to its standby position, the drawing port 51b of the drawing member 51, which generates drawing force, is positioned below the blow nozzle 22. Accordingly, even when the incompressible fluid drips down from the blow nozzle 22 that is moved to its standby position, it is possible to prevent the dripped down incompressible fluid from adhering to the molded container C or the mold 10.

Further, in the blow molding apparatus 1 according to the present embodiment, the drawing port 51b of the drawing member 51 is caused to open in the horizontal direction, and therefore, the incompressible fluid can be drawn into the drawing passage 51a of the drawing member 51 from the side when it is dripping down from the blow nozzle 22. Thus, the incompressible fluid that drips down from the blow nozzle 22 can be drawn into the drawing passage 51a of the drawing member 51, and at the same time, the incompressible fluid that drips down from the blow nozzle 22 can be prevented from adhering to the drawing member 51. Accordingly, the adhesion of the incompressible fluid to the drawing member 51 can be prevented, so that the blow molding apparatus 1 will not be spoiled.

As described above, in the course of or after the drawing of the incompressible fluid that drips down from the blow nozzle 22 using the drawing member 51, the mold 10 is opened, and the molded container C is removed and conveyed to the next step. Additionally, the blow molding apparatus 1 may be equipped with a cap fitting mechanism, and a cap may be fitted to the mouth tubular portion of the container C in a state in which the container C is placed in the mold 10.

Figure 8:
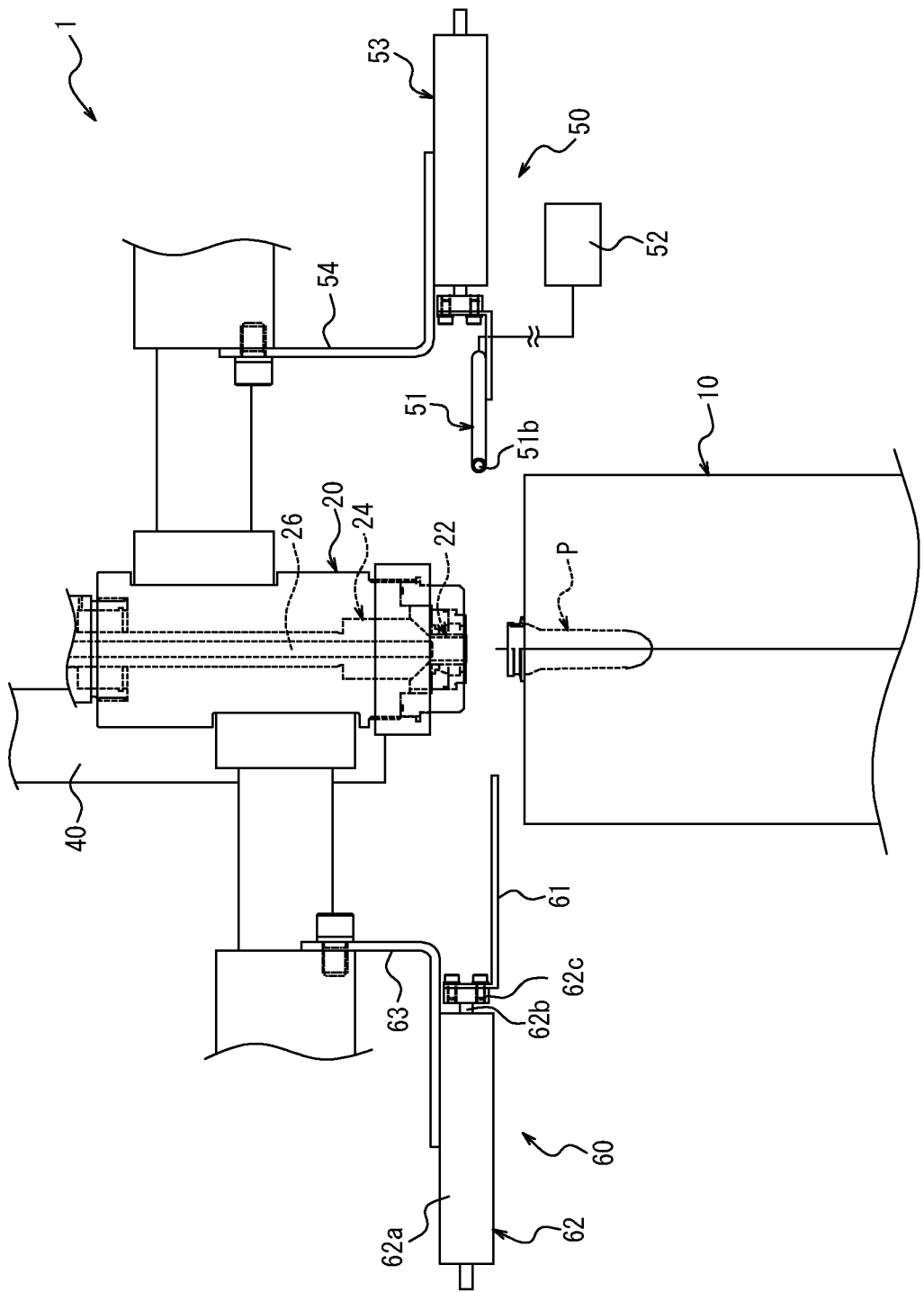
FIG. 8 illustrates a blow molding apparatus including a liquid receiving device according to a modification.
Figure 9:
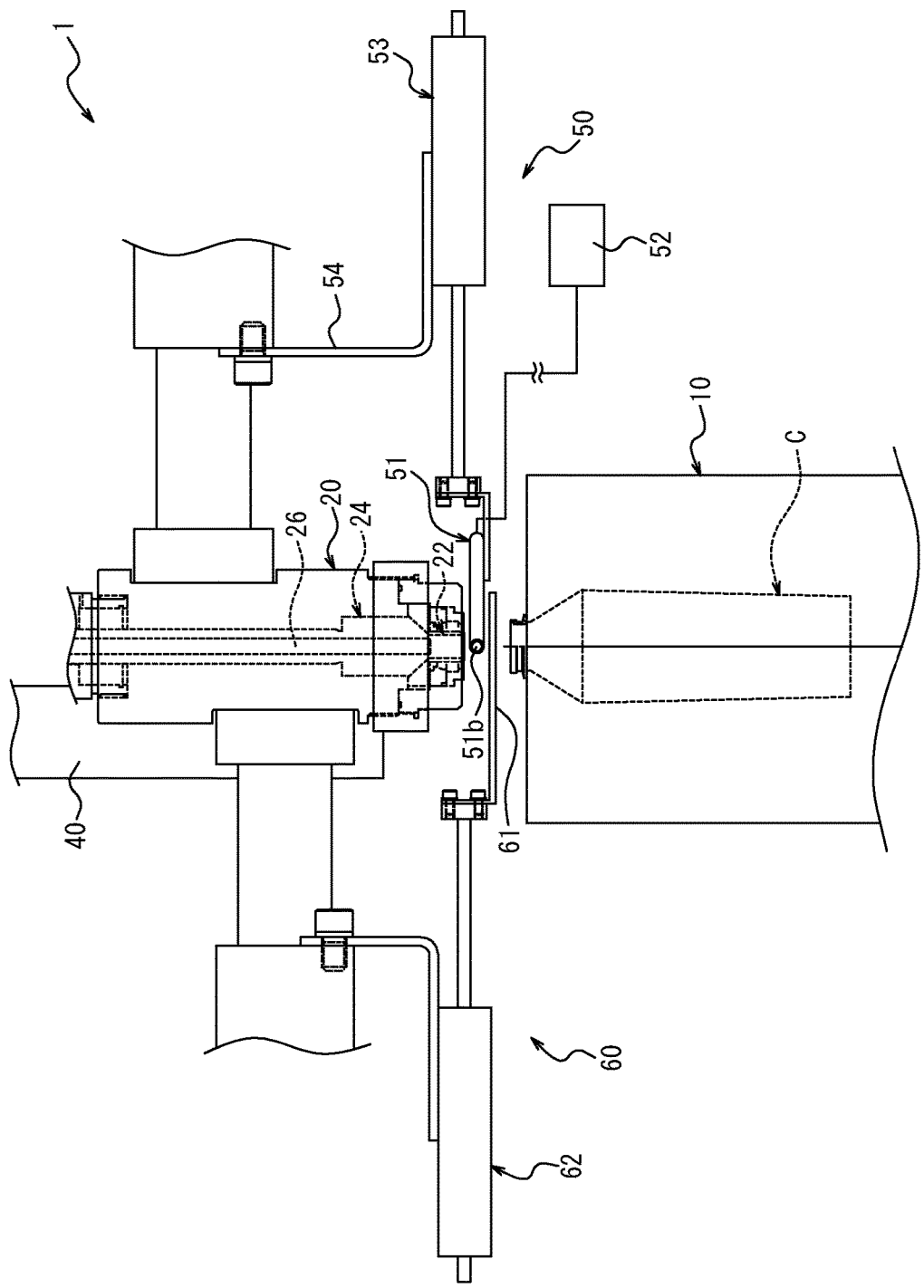
FIG. 9 illustrates the blow molding apparatus in a state in which a drawing member has been moved so that a drawing port is positioned below a blow nozzle and in which a saucer has been moved to below the blow nozzle, after a container has been molded and the blow nozzle has been moved from its connected position to its standby position.

FIG. 8 illustrates a blow molding apparatus including a liquid receiving device according to a modification, and FIG. 9 illustrates the blow molding apparatus in a state in which a drawing member has been moved so that a drawing port is positioned below a blow nozzle and a saucer has been moved to below the blow nozzle, after a container has been molded and the blow nozzle has been moved from its connected position to its standby position. Note that in FIG. 8 and FIG. 9 the same reference numerals are assigned to the members corresponding to those described above.

As illustrated in FIG. 8, the blow molding apparatus 1 according to the modification may be configured to include a liquid receiving device 60, in addition to the drawing device 50. The liquid receiving device 60 has a saucer 61 and a saucer moving unit 62.

The saucer moving unit 62 is configured by a cylinder with a guide. The saucer moving unit 62 includes a cylinder body 62a, a piston rod 62b that makes advancing and retracting movements with respect to the cylinder body 62a, and a guide 62c fixed to an end of the piston rod 62b. The cylinder body 62a is fixed to the nozzle unit 20 using a fixing bracket 63.

The saucer 61 is formed in a flat plate shape with a base end portion formed as an L-shape bent portion, at which the saucer 61 is fixed to the guide 62c.

As illustrated in FIG. 9, the saucer moving unit 62 operates to move the saucer 61 to below the blow nozzle 22 on the lower side of the drawing member 51, after the container C has been molded and the blow nozzle 22 has been moved from its inserted position to its standby position. In the present modification, the saucer moving unit 62 operates to move the saucer 61 to below the blow nozzle 22, after the drawing member moving unit 53 has moved the drawing member 51 so that the drawing port 51b is positioned below the blow nozzle 22.

Thus, since the blow molding apparatus 1 according to the modification includes the liquid receiving device 60, in addition to the drawing device 50, even when the incompressible fluid adheres to the blow nozzle 22 during blow molding and drips down from the blow nozzle 22 when it is moved to its standby position, the dripped down incompressible fluid can be drawn into the drawing passage 51a of the drawing member 51 through the drawing port 51b. Besides, the saucer 61 receives the incompressible fluid when it has dripped down after failing to be drawn by the drawing member 51. In this way, the dripping down of the incompressible fluid onto the molded container C or the mold 10 can be prevented even more reliably.

Further, in the blow molding apparatus 1 according to the modification, after the drawing member moving unit 53 has moved the drawing member 51 so that the drawing port 51b is positioned below the blow nozzle 22, the saucer moving unit 62 moves the saucer 61 to below the blow nozzle 22. Accordingly, it is possible to ensure that the timing of the movement of the saucer 61 to below the blow nozzle 22 is after the dripping down of the incompressible fluid has been addressed at an early stage by the drawing member 51 drawing the incompressibility fluid that drips down from the blow nozzle 22. For example, in a case in which the incompressible fluid that drips down from the blow nozzle 22 runs down in a thin stream extending from the blow nozzle 22 to the molded container C, the movement of the saucer 61 to below the blow nozzle 22 is timed to coincide with the incompressible fluid, which runs in the thin stream, having being drawn by the drawing member 51 and cut off. Thus, the incompressible fluid is prevented from adhering to a lower surface or the like of the saucer 61 and dripping down onto the molded container C or the mold 10.

Figure 10:
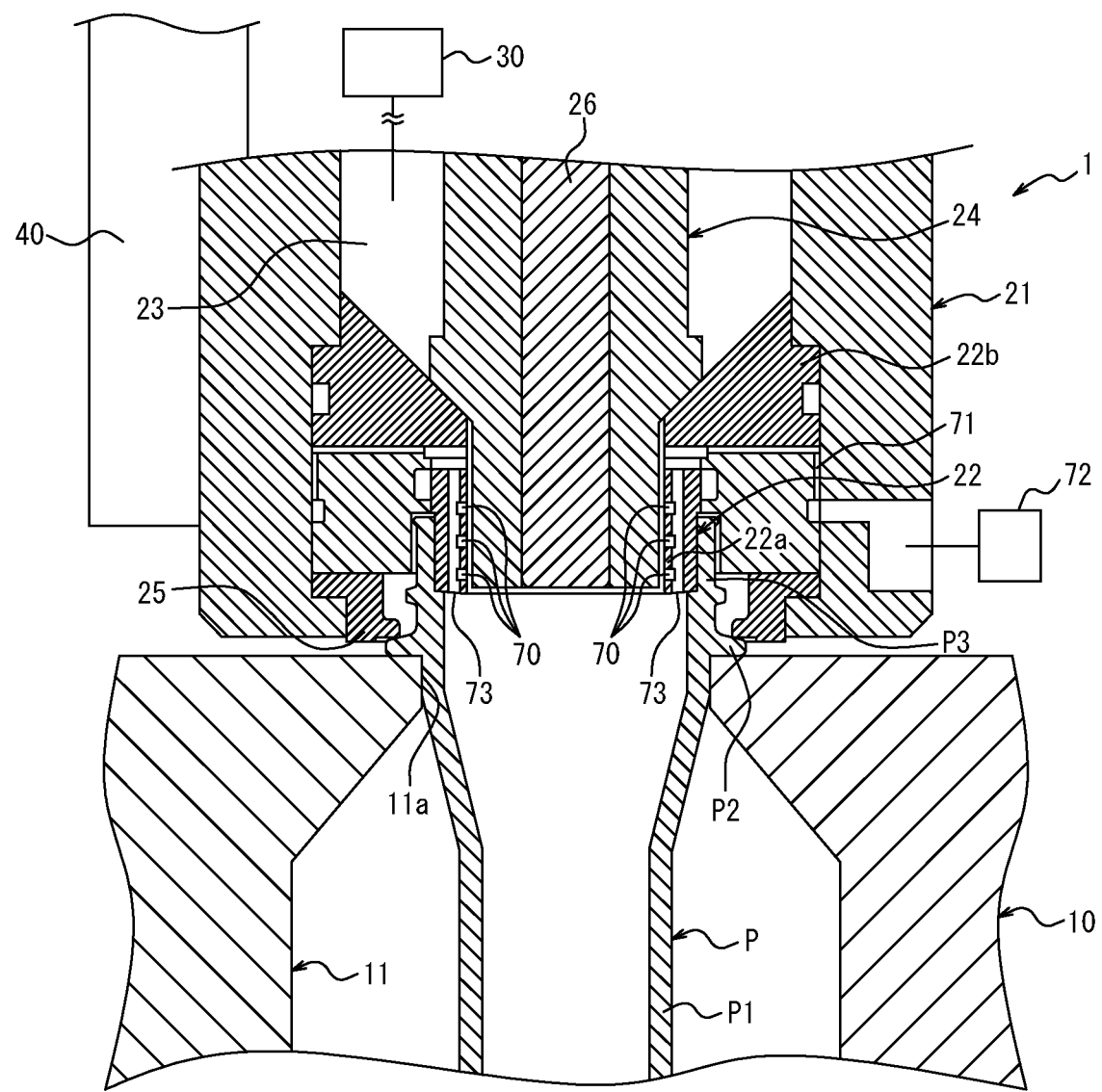
FIG. 10 is a sectional view illustrating a blow nozzle according to a modification.

FIG. 10 is a sectional view illustrating a blow nozzle according to a modification. In FIG. 10, the same reference numerals are assigned to members corresponding to those described above.

As illustrated in FIG. 10, the blow nozzle 22 may be configured to include drawing holes 70 on its inner peripheral surface. In the present modification, the inner peripheral surface of the blow nozzle 22 is provided with a plurality of drawing holes 70 that is arranged at an interval in the circumferential direction and that is also arranged at an interval in the axial direction.

These drawing holes 70 are each connected to a drawing pump 72 via a flow passage 71 provided between the blow nozzle 22 and the body block 21. The drawing pump 72 is configured by, for example, a vacuum pump, which can generate drawing force for drawing, into the respective drawing holes 70, the incompressible fluid adhered to the blow nozzle 22.

Additionally, the number or position of drawing holes 70 provided in the blow nozzle 22 can be appropriately changed.

In the illustrated example, the blow nozzle 22 is provided with a plurality of auxiliary drawing holes 73, in addition to the plurality of drawing holes 70. The plurality of auxiliary drawing holes 73 is open side by side at an interval from one another in the circumferential direction on a lower end surface of the nozzle body 22a of the blow nozzle 22. Each auxiliary drawing hole 73 is connected to the drawing pump 72 through the flow passage 71, as is the case with each drawing hole 70. The drawing pump 72 can generate drawing force for drawing, into the respective drawing holes 70 and also into the respective auxiliary drawing holes 73, the incompressible fluid adhered to the blow nozzle 22.

Additionally, the number or position of auxiliary drawing holes 73 provided in the blow nozzle 22 can be changed in various ways. Further, the blow nozzle 22 may be configured to be provided only with the drawing holes 70 or the auxiliary drawing holes 73.

According to the blow nozzle 22 of the modification that is configured as above, the incompressible fluid adhered to the blow nozzle 22 during blow molding can be drawn through the plurality of drawing holes 70 and auxiliary drawing holes 73. It is therefore possible to reduce the amount of the incompressible fluid that drips down from the blow nozzle 22 when it is moved to its standby position. Thus, the incompressible fluid can be even more reliably prevented from dripping down from the blow nozzle 22 and adhering to the molded container C or the mold 10, by ensuring that the incompressible fluid that drips down from the blow nozzle 22 when it is moved to its standby position can be drawn by the drawing member 51 of the drawing device 50.

Needless to say, the present disclosure is not limited to the above embodiment, and various changes may be made without departing the gist of the present disclosure.

For example, although in the above embodiment the blow nozzle moving unit 40 is configured to move the nozzle unit 20 or the blow nozzle 22 upward with respect to the mold 10, the present disclosure is not limited to this example. For example, the mold 10 may be configured to be moved downward with respect to the nozzle unit 20 or the blow nozzle 22. Alternatively, the nozzle unit 20 or the blow nozzle 22, and the mold 10 may be configured to be moved in a direction away from each other.

Further, the blow molding apparatus 1 may be configured without the liquid receiving device 60, the drawing holes 70, or the auxiliary drawing holes 73.

Moreover, the blow molding apparatus 1 may be configured to perform a suck-back operation by which a predetermined amount of the incompressible fluid is sucked back from the inside of the molded container C toward the supply flow path 23, by operating the pressurized fluid supply unit 30 in an opposite direction after blow molding and immediately before the seal body 24 is closed.

Moreover, although in the above embodiment the drawing device 50 and the liquid receiving device 60 are fixed to the nozzle unit 20, the drawing device 50 and the liquid receiving device 60 may be fixed to a member or the like other than the nozzle unit 20.

REFERENCE SIGNS LIST

1 Blow molding apparatus
10 Mold
11 Cavity
11a Opening
20 Nozzle unit
21 Body block
22 Blow nozzle
22a Nozzle body
22b Holding portion
23 Supply flow path
24 Seal body
25 Sealing claw portion
26 Stretching rod
30 Pressurized fluid supply unit
40 Blow nozzle moving unit
50 Drawing device
51 Drawing member
51a Drawing passage
51b Drawing port
52 Drawing pump
53 Drawing member moving unit
53a Cylinder body
53b Piston rod 53c Guide
54 Fixing bracket
55 Holding plate
60 Liquid receiving device
61 Saucer
62 Saucer moving unit
62a Cylinder body
62b Piston rod
62c Guide
70 Drawing hole
71 Flow passage
72 Drawing pump
73 Auxiliary drawing hole
P Preform
P1 Body
P2 Neck ring
P3 Mouth tubular portion
P4 Undercut portion
C Container
O Central axis

The invention claimed is:

1. A blow molding apparatus including:
a mold for blow molding;
a blow nozzle configured to be disposed above the mold;
a pressurized fluid supply unit configured to supply a pressurized incompressible fluid to the blow nozzle; and
a blow nozzle moving unit configured to cause a relative movement of the blow nozzle between a connected position in which the blow nozzle is connected to a mouth tubular portion of a preform that has been placed in the mold and a standby position in which the blow nozzle is upward and away from the mouth tubular portion, wherein
the preform is molded into a container having a shape corresponding to a cavity of the mold, by supplying the pressurized incompressible fluid into the preform through the blow nozzle which is in the connected position, the blow molding apparatus comprising:
a drawing member including a drawing port;
a drawing pump configured to be connected to the drawing member; and
a drawing member moving unit configured to move the drawing member so that the drawing port is positioned directly below the blow nozzle, after the container has been molded and the blow nozzle has been moved from the connected position to the standby position.

2. The blow molding apparatus according to claim 1, wherein the drawing port is open in a horizontal direction.

3. The blow molding apparatus according to claim 1, further comprising:
a saucer; and
a saucer moving unit configured to move the saucer to below the blow nozzle on a lower side of the drawing member, after the container has been molded and the blow nozzle has been moved from the connected position to the standby position.

4. The blow molding apparatus according to claim 3, wherein
after the drawing member moving unit has moved the drawing member so that the drawing port is positioned below the blow nozzle, the saucer moving unit moves the saucer to below the blow nozzle.

5. The blow molding apparatus according to claim 2, further comprising:
a saucer; and
a saucer moving unit configured to move the saucer to below the blow nozzle on a lower side of the drawing member, after the container has been molded and the blow nozzle has been moved from the connected position to the standby position.

6. The blow molding apparatus according to claim 5, wherein
after the drawing member moving unit has moved the drawing member so that the drawing port is positioned below the blow nozzle, the saucer moving unit moves the saucer to below the blow nozzle.

* * * * *